Patented Feb. 7, 1939

2,146,295

UNITED STATES PATENT OFFICE

2,146,295

POLYMERIZED VINYL ALCOHOL ARTICLES AND PROCESS OF MAKING SAME

Willy O. Herrmann, Munich, Germany, Erich Baum, Haifa, Palestine, and Wolfram Haehnel, Munich, Germany, assignors to Chemische Forschungsgesellschaft m. b. H., Munich, Germany, a corporation of Germany No Drawing. Application December 21, 1935, Serial No. 55,676. In Germany March 10, 1931

10 Claims. (Cl. 18—54)

This invention relates to polymerized vinyl alcohol articles and a process of making same, and is a continuation in part of our application Serial No. 596,570, filed March 3, 1932 now Patent No. 2,072,302.

An object of the invention is to prepare from solutions of polymerized vinyl alcohol formed articles, such as threads, yarn, artificial silk, artificial hair, artificial catgut, horse hair, musical strings, ribbons, tubes, capsules, pellets, etc.

Another object of the invention is to prepare such articles having widely different physical properties.

A further object is to prepare such articles with medicinal and therapeutic properties.

A still further object is to supply the surgical art with an advantageous, absolutely sterile substitute for catgut, silkwormgut, silk, linen thread, horse hair and the like.

It is well known that aqueous solutions of polymerized vinyl alcohol upon evaporation yield films. We have found that, in spite of the great affinity of polymerized vinyl alcohol for water, aqueous solutions of such alcohol will produce threads, etc., which can be wound after their formation on a reel, drum or other similar device, according to usual spinning processes.

Such articles may be prepared in many ways, as by forming a viscous solution or paste, by dissolving or soaking the polymerized vinyl alcohol in a suitable solvent, as, for example, glycol, glycerine, formamide, and especially in water preferably containing substances which aid in the evaporation of the water, such as an alcohol, acetone and the like. From such solutions or pastes, threads, bands, tubes, etc. can be made, for example by causing such solutions or pastes of the proper viscosity and temperature to form drops, from which result the desired threads. This may be accomplished by placing the solution or paste in a container with a perforated bottom. Or, the solution or paste may be forced through nozzles and the expressed threads may, if desired, be treated according to the processes used in the manufacture of artificial silk, such as stretching the thread, influencing the evaporation of the solvent, using a precipitate bath, etc. The solidification of the extruded threads and the like can be promoted by chilling to low temperatures or by other methods hereinafter described. In general, it is recommended that relatively high concentrated solutions or pastes, and increased temperatures and pressures corresponding to the viscosity, be used. However, for the purpose of obtaining resorptive threads, the process may be carried out at relatively low temperatures.

High-molecular polymerized vinyl alcohol may be obtained by saponification of high-molecular polymerized vinyl ester, especially vinyl acetate. Low-molecular polymerized vinyl alcohol may be obtained by saponification of low-molecular polymerized vinyl ester. As criterions for the grade of polymerization are considered the viscosity and solubility of the polymerization products. (See Staudinger, Frey and Starck. Berichte der Deutschen Chemischen Gesellschaft, 1927, S. 1783.)

Articles produced according to our invention possess surprisingly great tensile strength, and resistance to fracture. Our process is especially suitable for the preparation of all kinds of articles which are subject to high mechanical requirements; and the articles produced thereby are colorless and transparent, or they may be colored by means of pigments or made opaque by means of filling materials. The properties of these articles can be adapted to different purposes through selection of the proper form of polymerized vinyl alcohol. In general, high-molecular polymerized vinyl alcohols have better mechanical properties than low-molecular types.

In the presence of cold water for a long period of time or in the presence of warm water for a shorter time, the articles tend to swell but such swelling is not detrimental, and the tensile strength, and the resistance to fracture are not affected thereby. The tendency to swell may be overcome by the addition of substances which have no affinity for water, by coating the surface of the article with a protective layer, as for example, of a lacquer, or by physical or chemical changes in the surface of the article. The properties may also be modified in many ways by the addition of filling materials, softeners, pigments, organic solvents, etc. to the initial solution or paste, or during the spinning process.

Polymerized vinyl alcohol threads are well suited for textile purposes, either as such or in combination with other threads, and new and desirable color effects may be obtained thereby. Such products may also be used as artificial hair or horse hair. The threads may also be used in the preparation of material for bandages and other medicinal purposes, and, being non-inflammable, they are especially suitable for such purposes.

Threads produced according to our process are useful as sewing materials or closing means in surgery, and especially for internal stitching as they are far superior to the usual catgut threads in that, among other things, they are completely sterilized by our process and they remain sterilized. The sterilization of raw catgut presents great difficulties and requires great care, while polymerized vinyl alcohol directly forms sterile threads and the formed threads can be easily sterilized if subsequently contaminated. Buttons for the joining of intestines, tubes for stitches in nerves, for draining wounds, and the like, have the same property. In such uses, a more or less slowly soluble and resorptive polymerized vinyl alcohol should be selected according to the need. For surgical purposes, the resorptive polymerized vinyl alcohol articles may be replaced by the non-resorptive forms, neither form causing suppuration or fistular formation.

The above substances in tubular form may be usable for non-medical purposes by reason of their characteristic properties. The material for example is unaffected by combustible substances such as benzol, benzine, alcohol and oils. Consequently it is useful as tubing for the conduction of such materials in place of rubber tubing which is affected thereby.

The resorptive forms are advantageous substitutes especially for threads formed of catgut, silkwormgut and so on. They are resorbed in the same manner as said materials. The non-resorptive forms are suitable substitutes for silk, linen threads, catgut and the like heretofore commonly used in surgery. Both forms and their middle forms are useful for various surgical purposes.

The resorptiveness of the threads, tubes, etc. can be varied within wide limits according to the uses of the same. This is possible by selection of the proper polymerized vinyl alcohol, by changes in the solution concentration, or in the solvent, for example, by using different mixtures of solvents and insoluble organic liquids, by the addition of salts, by changes in the working pressure, etc.

Slightly polymerized vinyl alcohol, whose solutions lack the required viscosity for the preparation of the threads etc. may be used, as the viscosity of a given solution can be increased in a surprising manner by suitable additions, such as borax and cane sugar; and by means of such additions it is possible to use a given polymerized vinyl alcohol in less concentrated solution than would be ordinarily possible. The properties of the solution may be modified by using a mixture of widely different polymerized vinyl alcohols.

The solvent for the polymerized vinyl alcohol may be water, an organic liquid, or a mixture of water and an organic liquid. Ethylene glycol, butylene glycol, glycerine, formamide, etc., may be used as organic solvents. A mixture of water and glycerine gives a product of good resorptive properties.

The formed articles are especially suitable for therapeutic purposes, and medicinal compounds, in the form of a solution or suspension, may be added. If a solvent is used for the medicinal compound it is preferable to select one which aids in the evaporation of the water. Disinfectants, substances aiding in granulation, vasomotorial substances, serums and the like may also be added. Thick medicated threads, etc. may be prepared, and these can be cut up in small pieces. Tubular articles can also be made in the form of capsules, in which can be placed other medicines or solutions of medicines.

The threads can also be woven into cloths for therapeutic purposes. Such cloths may be placed between the injured part of the body and a continuous bandage or cast, as for example a plaster cast or other bandage which is not to be removed, and a more or less lasting therapeutic effect is thereby given to the injured member, which is not ordinarily possible. It is also possible to use such materials for bandages, cloths for various medicinal purposes, and the like, and the same will offer a more or less lasting medicinal effect.

Furthermore, it is possible for certain surgical purposes to give the threads different colors, for example, blue or green, in order to facilitate probing for the inserted thread. In such a case, barium sulphate or bismuth compounds may be incorporated with the thread, thereby making the internal threads visible in X-ray photography.

The required resorptiveness for surgical purposes can be realized in many ways, as by using a moderately high polymerized vinyl alcohol, employing a moderate temperature in the spinning process, or by adding to the solution or paste to be worked, a soluble resorptive material such as gelatine, gums, sugars and the like, or substances which can be made soluble by fermentation, for example, albumin, starch, borax, etc.

In accordance with the above, it is possible to adapt the properties of the threads, etc. to many different requirements, and thereby increase the uses of the same, and the various forms of the articles possess good mechanical properties.

More specifically, a solution of polymerized vinyl alcohol in water, alcohol or other solvents with or without additions of other materials for the purposes herein specified may be initially treated by heating to 100° C. or by heating in an autoclave to 160° C. for a sufficient period of time to permit the evolution of gas to take place for sterilizing and gelatinizing the mass. Beginning with a dilute solution of polymerized vinyl alcohol, the mass may be concentrated in this manner to a 20% to 60% solution and may be sterilized as by heating to 100° C. or by heating in the autoclave as pointed out above. The solution may then be extruded to form threads, bands, tubes or the like which may be suitably treated and spun or wound upon a spinning apparatus under conditions suitable for making the desired product.

In the spinning apparatus the mass is heated to a temperature up to about 160° C. in order to gelatinize the mass and to sterilize it further. For example, a temperature of 130–150° C. for at least one-half hour may be used. This has its basis in that according to hygienic directions all bacteria and germs are completely destroyed by heating in a moist atmosphere (the spinning mass contains water) after one-half hour. Hence the absolute sterility of the spinning mass is effected by this process.

The spinning itself follows at a temperature of room temperature to upwards. It is preferable to work at over 100 to 160° C. It has been found that temperatures of 130 to 140° C. are suitable to obtain absolute sterility in the product.

The threads or the like extruded from the orifice are preferably subsequently treated. This can be accomplished by spinning in dry heated air at 100–160° C. or in other gas, for example nitrogen. For accelerating the drying there can be supplied to the drying chamber vapors of liquids, which act on the threads and further dry them, as hygroscopic vapors (for example alcohol) or vapors forming azeotropic mixtures with steam (for example benzol) or chlorinated hydrocarbons or alcohol which simultaneously "tans".

In this manner the surface of the threads stabilizes quickly and the thread structure is made lasting. In this way deformation, for example a beveling of the round thread in unwinding, is diminished.

The preferred manner of working is to spin the threads from the orifice in a drying or "tanning" liquid. For this purpose we mention, for example, ethyl alcohol, which withdraws water from the surface of the threads and gives to the threads a stable structure. The tanning liquid is preferably continuously renewed. This drying process can be accelerated by heating to the boiling temperature of the tanning liquid. Instead of ethyl alcohol, it is possible also to use other alcohols such as propanol and butanol, as well as other suitable water withdrawing liquids which do not attack the threads. If a spinning mass is used with contains other additions besides the polymerized vinyl alcohol, which can be dissolved by the tanning liquid, then smaller or greater amounts of the addition materials, for example organic acids, corresponding to the solubility, may be added to the tanning liquid.

The threads extruded from the tanning bath can be used immediately after drying. In many cases it is advantageous to stretch these threads. According to the composition of the spinning mass and according to the manner of working the threads can be stretched to six times their length and more. Through this stretching process the mechanical properties of the threads can be influenced in a favorable way. The linear tensile strength, the tying strength, the expansion and the like are improved by stretching. After the spinning or the stretching or both, drying is advantageous. This can follow at room temperature which requires a longer time, for example a few days; or it can be carried out at elevated temperatures up to about 160° C. which is accomplished in a shorter time. The threads are sterile at the end of the process and are packed under sterile conditions.

It is advantageous to carry out the whole process of preparation under sterile conditions, to stay away from unsterile impurities and to use relatively high working temperatures.

We have found that for aiding the resorption of the possible additions, the addition of electrolytes especially of organic acids as for example, lactic acid, acetic acid or their salts may be used.

A few specific examples illustrating the present process follow:

Example I 40 parts of high molecular polymerized vinyl alcohol are worked up with 60 parts of water to a homogeneous paste. This paste is placed in an autoclave, which is provided with an extrusion nozzle of 0.6 mm. diameter with a regulating valve as well as an inlet for compressed nitrogen. At first the mass is heated in the closed autoclave for a time at about 130° C. in order to complete the solution of the polymerized vinyl alcohol and to make the expressed product bubble free. Then the autoclave is placed under a pressure of about 90 atmospheres and the nozzle valve opened. The expression velocity is regulated by the regulating valve. The extruded threads are passed through a bath containing wood alcohol spirit. Solidification occurs and a silklike thread of great tensile and bending strength is obtained, and such thread can be wound up without further treatment.

Example II 40 parts of medium molecular polymerized vinyl alcohol are mixed with 60 parts of water and this mixture held in a pressure apparatus of glass, iron or other suitable material for one or more days in a water bath at 100° C. A homogenization of the mass results and the mass degasifies and becomes gelatinous. Through this prolonged heating at about 100° C. the stored bacteria and germs are destroyed. The spinning mass treated in this manner is now led from the pressure apparatus to the spinning process or is introduced into another spinning autoclave. Before spinning the mass is held at a temperature of 130–140° C. for a half hour or longer and in this way the complete sterilization of the spinning mass is realized. Now the spinning mass is further worked, for example as in Example I or in another suitable manner, and according to the nozzle, is formed into threads, bands, tubes, etc. As far as the product is required for surgical or sterilized use, the spinning process and the packing of the product is carried out according to known aseptic conditions.

Example III

A solution is prepared from 20 parts of high molecular polymerized vinyl alcohol and 80 parts water. This solution is filtered under pressure and concentrated in a suitable evaporation apparatus with stirring to 37%–40%. This spinning mass is introduced in a corresponding manner under sterile conditions in a previously sterilized spinning autoclave and the spinning process carried out as in Example II under sterile conditions. The threads, cords, or tubes recovered from the spinning nozzle are led through a drying chamber, through which is passed countercurrently heated alcohol vapors. After the drying chamber the product is hung or reeled up in a suitable manner and then for the subsequent drying and maturing is subsequently dried for a few days in a sterile room at room temperature or for a shorter time in a sterile drying chamber at temperatures up to about 150° C.

Example IV

A spun thread obtained for example according to the preceding Examples I–III, after removal from the bath or before drying, is stretched in a suitable stretching apparatus, for example in the ratio of 1:2. The thread produced in this manner can be subjected according to Example III to subsequent drying at room temperature or at an elevated temperature up to about 150° C. The stretching ratio can be varied, for example between 1:1.1 and 1:6 or still further. The stretching is governed according to the working conditions of the process and according to the requirements of the product.

Example V

A mass is prepared of 38 parts of high molecular polymerized vinyl alcohol, 10 parts of lactic acid and 60 parts water. This mass is further ripened or treated directly in an autoclave provided with an extrusion nozzle, at 130–140° C. The further working follows under the corresponding use of the methods of working stated in the previous examples.

More or less lactic acid can be added to the spinning solution as desired. The lactic acid can be replaced by other organic acids especially aliphatic acids as acetic acid, aspartic acid, glycocol, tartaric acid, oxalic acid, maleic acid and others; also by derivatives as for example acid amides, acid nitriles, salts, especially the alkali and alkali earth and the ammonium, or derivatives of organic bases.

It is expedient to carry out the same preparation and process of working under sterile conditions for the threads, bands, cords, tubes, which are used for medicinal purposes. In the working process temperatures of 130–150° C. are used, resulting in sterilization. Likewise all impurities such as bacteria, germs and spores are kept away during further working under aseptic clinical conditions.

It has been found that ethyl ester of lactic acid may be incorporated with the spinning solution to produce threads, etc. which are very flexible. Iodoform may also be incorporated therewith without affecting the mechanical properties and to produce a thread having antiseptic properties. The material may be colored by the addition of suitable coloring substances such as for example 0.3% of Mowilith blue; barium sulphate or other barium or bismuth compounds visible under X-ray may also be incorporated with the solution to produce a thread which when used for internal stitching is visible under X-ray. The resorptiveness of the thread may be promoted by the addition of materials having absorptive properties such as gelatine, albumin, gum, starch, sugar and the like. A surgical thread having increased resorptiveness may for example be made from a low molecular polymerized vinyl alcohol solution at a temperature of about 80° C. in accordance with any of the examples above given. Furthermore, if the threads are exposed for a period of time to formaldehyde vapors or nitrogen the surface may be so affected as to render the same impervious to water. They may, for example, be exposed to formaldehyde vapors for about three hours at 100° C. or to a stream of nitrogen for about eight hours at 150° C.

A polymerized vinyl alcohol solution, as used in the appended claims, includes not only a concentrated solution but also a solution of pasty consistency.

Our invention is not limited to all of the details hereinbefore described, but may be otherwise embodied within the scope of the appended claims. Especially the working temperatures may be selected in accordance with the viscosity of the given solution of polymerized vinyl alcohol and the other conditions of working. When working at elevated temperatures the solubility and resorptiveness of the polymerized vinyl alcohol can be diminished. Therefore to ensure certain degrees of solubility we may prefer to work at ordinary room temperature.

We claim as our invention:

1. Process of making an article of the class described which comprises making a dilute solution of polymerized vinyl alcohol, concentrating the same to a 20% to 60% solution under conditions of heat and pressure such that a substantial quantity of solvent is released, and maintaining said conditions for a period of time adapted to gelatinize the mass, and thereafter extruding the mass through a suitable orifice to produce a thread, tube or the like.

2. Process of making an article of the class described which comprises heating a liquid solution of polymerized vinyl alcohol at a temperature between 100 and 160° C. until its consistency becomes viscous to pasty enabling the mass to be extruded to form a thread, tube or the like, and maintaining said temperature for at least a half hour extruding and working up the same at a temperature between room temperature and 160° C. whereby a sterile product is obtained.

3. Process of making an article of the class described which comprises making a solution of polymerized vinyl alcohol in a condition to be extruded to form a thread, tube or the like, maintaining a temperature of between 130 and 140° C. for at least a half hour in said solution, extruding the thus heated mass and working up the extruded thread, tube or the like at said temperature whereby a sterile product is obtained.

4. Process of making an article of the class described which comprises making a solution of polymerized vinyl alcohol having a viscous pasty consistency suitable for extrusion to form threads, tubes and the like, extruding said solution through orifices and treating the extruded material with heated gases containing vapors of substances selected from the group consisting of aldehydes and hydrophilic alcohols which are adapted to harden the material.

5. Process of making an article of the class described which comprises making a solution of polymerized vinyl alcohol having a viscous pasty consistency suitable for extrusion to form threads, tubes and the like, extruding said solution through orifices and treating the extruded material with gases heated to a temperature of 100 to 160° C. and containing alcohol vapors whereby to promote the drying of the material.

6. Process of making an article of the class described which comprises making a water-containing solution of polymerized vinyl alcohol having a viscous pasty consistency suitable for extrusion to form threads, tubes and the like, extruding said solution through orifices and treating the extruded material with a hydrophilic liquid.

7. Process of making an article of the class described which comprises heating a liquid solution of polymerized vinyl alcohol at a temperature between 100 and 160° C. until its consistency becomes viscous to pasty suitable for extrusion to form threads, tubes and the like, maintaining said temperature for at least a half hour, extruding said solution through orifices and treating the extruded material with a liquid heated to a temperature up to the boiling point and adapted to withdraw water from the material.

8. Process of making an article of the class described which comprises forming a solution of polymerized vinyl alcohol having a viscous pasty consistency suitable for extrusion, extruding said solution to form a thread, tube or the like, and drying the same at a temperature between 100 and 160° C.

9. A composition comprising a solution of polymerized vinyl alcohol and an aliphatic organic acid having a viscous pasty consistency, suitable for extrusion.

10. A sterile thread, tube or the like consisting essentially of polymerized vinyl alcohol and at least one addition of a material selected from the group consisting of aliphatic organic acids and their salts, esters, amides and nitriles.

WILLY O. HERRMANN.
ERICH BAUM.
WOLFRAM HAEHNEL.